US008706694B2

(12) United States Patent  
Chatterjee et al.

(10) Patent No.: US 8,706,694 B2
(45) Date of Patent: Apr. 22, 2014

(54) CONTINUOUS DATA PROTECTION OF FILES STORED ON A REMOTE STORAGE DEVICE

(75) Inventors: Paresh Chatterjee, Fremont, CA (US); Sharon Samuel Enoch, Newark, CA (US); Ajit Narayanan, Tamil Nadu (IN)

(73) Assignee: American Megatrends, Inc., Norcross, GA (US)

( * ) Notice: Subject to any disclaimer, the term of this patent is extended or adjusted under 35 U.S.C. 154(b) by 210 days.

(21) Appl. No.: 12/472,858

(22) Filed: May 27, 2009

(65) Prior Publication Data

US 2010/0017444 A1 Jan. 21, 2010

Related U.S. Application Data

(60) Provisional application No. 61/080,801, filed on Jul. 15, 2008.

(51) Int. Cl.
*G06F 7/00* (2006.01)
*G06F 17/00* (2006.01)

(52) U.S. Cl.
USPC .......................................................... 707/640

(58) Field of Classification Search
USPC .......................................................... 707/640
See application file for complete search history.

(56) References Cited

U.S. PATENT DOCUMENTS

| 4,942,579 | A | 7/1990 | Goodlander et al. |
|---|---|---|---|
| 5,257,367 | A | 10/1993 | Goodlander et al. |
| 5,720,027 | A | 2/1998 | Sarkozy et al. |
| 5,732,238 | A | 3/1998 | Sarkozy |
| 5,790,774 | A | 8/1998 | Sarkozy |
| 5,893,919 | A | 4/1999 | Sarkozy et al. |
| 6,098,128 | A | 8/2000 | Velez-McCaskey et al. |
| 7,100,089 | B1 * | 8/2006 | Phelps .............. 714/42 |
| 7,373,366 | B1 * | 5/2008 | Chatterjee et al. ........... 1/1 |
| 7,406,488 | B2 * | 7/2008 | Stager et al. ................ 1/1 |
| 7,549,027 | B1 | 6/2009 | McAndrews et al. |
| 7,651,593 | B2 | 1/2010 | Prahlad et al. |
| 7,689,597 | B1 * | 3/2010 | Bingham et al. ....... 707/999.2 |
| 7,698,503 | B2 | 4/2010 | Okada et al. |
| 7,725,667 | B2 * | 5/2010 | Rowan et al. ........... 711/162 |
| 7,822,827 | B2 * | 10/2010 | van Rietschote et al. ... 709/217 |
| 7,844,643 | B2 * | 11/2010 | Judd ...................... 707/813 |

(Continued)

OTHER PUBLICATIONS

U.S. Appl. No. 12/013,099, filed Jan. 11, 2008 entitled "Storage System Snapshots for Continuous File Protection", Inventors: Chatterjee et al.

(Continued)

*Primary Examiner* — Mariela Reyes
*Assistant Examiner* — Michael Pham
(74) *Attorney, Agent, or Firm* — Meunier Carlin & Curfman, LLC

(57) ABSTRACT

Technologies are described herein for providing file-level CDP of files stored on a remote storage system. A client module executing on a client computer monitors for modifications made at the client computer to files or folders stored on a virtual storage volume provided by the remote storage system. Upon detecting a modification of a monitored file, the client module sends a message to the remote storage system identifying the file. A server module executing in the remote storage system receives the message identifying the modified file and copies a version of the file containing the modification from the virtual storage volume to a backup volume located in the remote storage system.

20 Claims, 4 Drawing Sheets

(56) References Cited

U.S. PATENT DOCUMENTS

| | | | |
|---|---|---|---|
| 7,885,938 B1* | 2/2011 | Greene et al. | 707/674 |
| 7,890,461 B2 | 2/2011 | Oeda et al. | |
| 7,904,428 B2 | 3/2011 | Perry et al. | |
| 7,930,275 B2 | 4/2011 | Chen et al. | |
| 7,966,293 B1 | 6/2011 | Owara et al. | |
| 7,991,748 B2 | 8/2011 | Rowan et al. | |
| 8,005,795 B2 | 8/2011 | Galipeau et al. | |
| 8,010,491 B2 | 8/2011 | Edelstein et al. | |
| 8,108,429 B2 | 1/2012 | Sim-Tang et al. | |
| 8,117,162 B2* | 2/2012 | Haselton et al. | 707/640 |
| 2005/0182910 A1 | 8/2005 | Stager et al. | |
| 2007/0083567 A1 | 4/2007 | Arai et al. | |
| 2007/0112894 A1 | 5/2007 | Okada et al. | |
| 2007/0143366 A1* | 6/2007 | D'Souza et al. | 707/203 |
| 2007/0162513 A1* | 7/2007 | Lewin et al. | 707/200 |
| 2007/0198604 A1 | 8/2007 | Okada et al. | |
| 2007/0220309 A1* | 9/2007 | Andre et al. | 714/6 |
| 2007/0233756 A1* | 10/2007 | D'Souza et al. | 707/204 |
| 2007/0276878 A1* | 11/2007 | Zheng et al. | 707/202 |
| 2008/0027998 A1 | 1/2008 | Hara | |
| 2008/0071841 A1 | 3/2008 | Okada et al. | |
| 2008/0071842 A1 | 3/2008 | Tokuda et al. | |
| 2008/0091744 A1* | 4/2008 | Shitomi et al. | 707/204 |
| 2008/0154914 A1 | 6/2008 | Kan et al. | |
| 2008/0162662 A1 | 7/2008 | Fujita et al. | |
| 2008/0208927 A1* | 8/2008 | Chikusa et al. | 707/203 |
| 2008/0281879 A1* | 11/2008 | Kawamura | 707/204 |
| 2009/0182784 A1* | 7/2009 | Rohit et al. | 707/202 |
| 2009/0182959 A1* | 7/2009 | Rao | 711/159 |
| 2009/0327357 A1* | 12/2009 | Beglin et al. | 707/202 |

OTHER PUBLICATIONS

U.S. Appl. No. 12/173,188, filed Jul. 15, 2008 entitled "Continuous Data Protection Journaling in Data Storage Systems", Inventors: Chatterjee et al.

U.S. Official Action dated Jun. 21, 2011 in U.S. Appl. No. 12/173,188.

* cited by examiner

CONTINUOUS DATA PROTECTION OF FILES STORED ON A REMOTE STORAGE DEVICE

CROSS-REFERENCE TO RELATED APPLICATION

This application claims the benefit of U.S. provisional patent application No. 61/080,801, filed on Jul. 15, 2008, entitled "Continuous Data Protection in Storage Area Network and Network Attached Storage Systems," which is expressly incorporated herein by reference in its entirety.

BACKGROUND

Continuous data protection ("CDP"), also called continuous backup, generally refers to the backup of data on a computer by automatically saving a copy of every change made to that data. While traditional backup solutions take a snapshot of the files or data on a computer at a specific time, CDP essentially captures every new version of the data saved on the computer in real-time. CDP may be performed at the file-level or the device-level. Device-level CDP generally allows a user or administrator to roll back the entire state of the device, such as a disk drive, to any point in time, while file-level CDP may allow a user to view and select a specific version of a particular file to restore.

File-level CDP is typically implemented through a service executing on a computer that monitors specified files and folders stored on a local disk drive or other storage device. When a monitored file is changed, the new, modified version of the file is copied to a backup location. Often the modified file is compressed and/or encrypted before copying to the backup location. The backup location may be a local storage device, or the backup location may be a remote storage device.

When monitored files are stored on a remote storage device, such as in the case of a "thin client" computer booting over a network, traditional file-level CDP implementations may be inefficient. After the changes to the file are written across the network by the thin client computer, the CDP service must then write the modified file to the backup location across the network, potentially doubling network bandwidth usage required for file modifications. In addition, the compression and/or encryption of the modified file are still performed by the client computer, utilizing processing and memory resources and degrading the performance of the client computer.

It is with respect to these considerations and others that the disclosure made herein is presented.

SUMMARY

Technologies are described herein for providing file-level CDP of files stored on a remote storage system. Through the utilization of the technologies and concepts presented herein, when a client computer modifies a file stored on a remote storage device, the storage system hosting the remote storage device handles the copying of the modified file to a backup location in the storage system and any compression or encryption of the backup file. This prevents the client computer from having to write the backup copy of the file over the network, thus reducing network utilization, as well as relieving the client computer of the processing load of compressing and/or encrypting the backup file.

According to one embodiment, a client module executing on a client computer monitors for modifications made at the client computer to files or folders stored on a virtual storage volume provided by a data storage system. Upon detecting a modification of a monitored file, the client module sends a message to the data storage system identifying the file. A server module executing in the data storage system receives the message identifying the modified file and copies a version of the file containing the modification from the virtual storage volume to a backup volume also located in the data storage system.

It should be appreciated that the above-described subject matter may also be implemented as a computer-controlled apparatus, a computer process, a computing system, or an article of manufacture, such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing efficient file-level continuous data protection ("CDP") of files stored in a remote storage system. A CDP client module executing on a client computer is able to monitor for changes made to the files stored on a remote volume of a storage system. When a change is detected, the CDP client informs a CDP server module executing in the remote storage system of the changed file, and the CDP server module then compresses, encrypts, and/or copies the modified file to the backup location. Because the backup location may be a volume in the same storage system, the backup of the modified file may be done without incurring additional network bandwidth utilization. In addition, the compression and encryption are performed utilizing storage processor resources and thus do not degrade client computer performance.

While the subject matter described herein is presented in the general context of program modules that execute on one or more client computers and/or storage nodes of a storage system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, microprocessor-based systems, programmable consumer electronics, minicomputers, mainframe computers, special-purposed hardware devices, network appliances, and the like.

In the following detailed description, references are made to the accompanying drawings that form a part hereof, and that show, by way of illustration, specific embodiments or examples. Like numerals represent like elements throughout the several figures.

Figure 1:
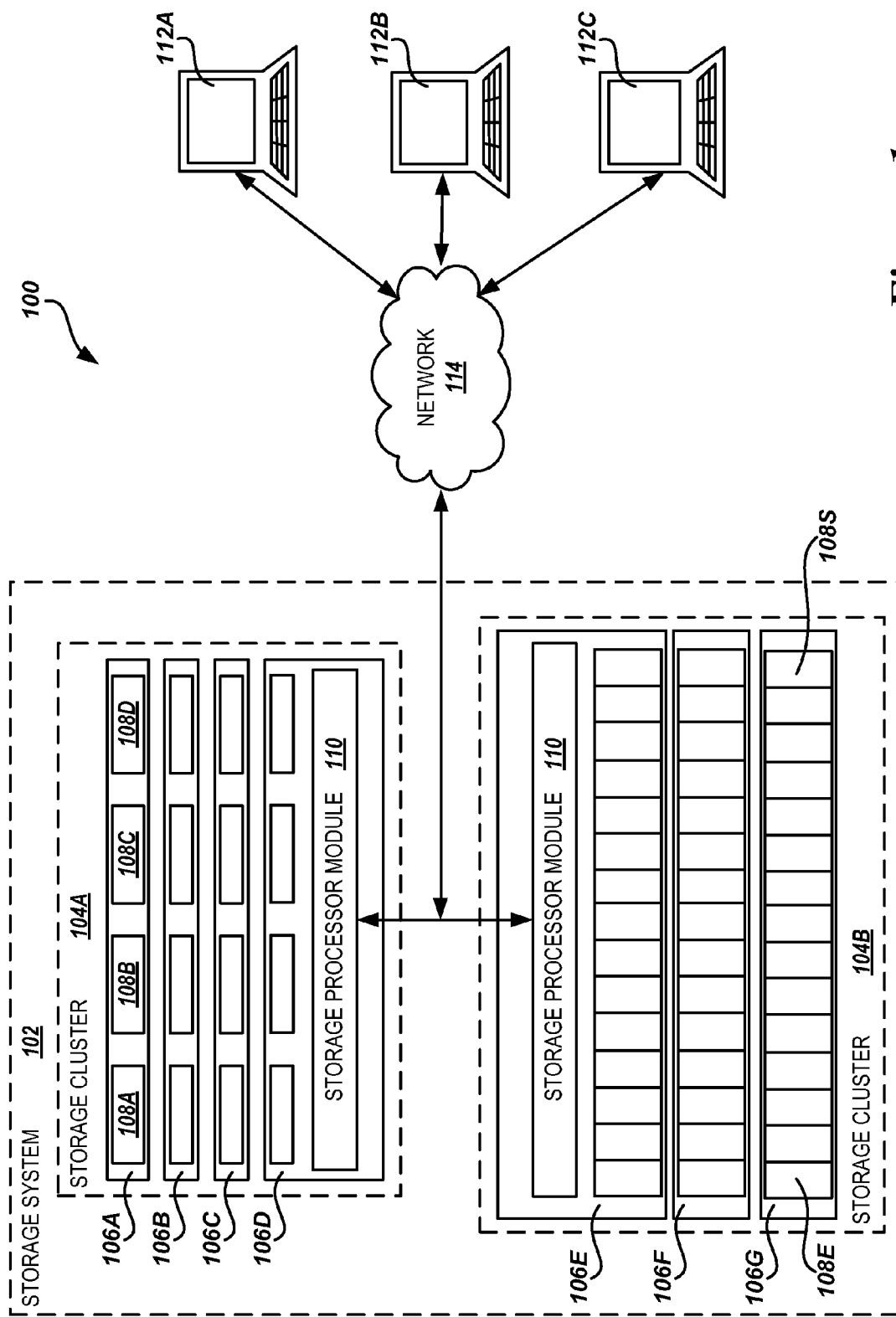
FIG. 1 is a block diagram showing aspects of an illustrative operating environment, including details of an exemplary storage system according to embodiments presented herein.

FIG. 1 shows aspects of an illustrative operating environment 100 for the embodiments described herein, including a storage system 102 that may be utilized to provide the remote storage capabilities described in the embodiments. The storage system 102 includes a number of virtualized storage clusters 104A-104B (referred to generally herein as cluster 104). A virtualized storage cluster 104 is a cluster of different storage server computers or storage nodes 106A-106G (referred to generally herein as storage node 106). For example, the storage system 102 shown in FIG. 1 includes two storage clusters 104A and 104B. The cluster 104A includes storage nodes 106A-106D and the cluster 104B includes the storage nodes 106E-106G.

Each storage node 106 includes one or more mass storage devices or "disks" 108A-108S (referred to collectively herein as disks 108). According to one embodiment, the disks 108 are traditional hard disk drives. Further examples of disks 108 may include optically scanned media, solid-state media, non-volatile memories, or tape media; each, or in combination, employing magnetic, capacitive, optical, semiconductor, electrical, quantum, dynamic, static, or any other data storage technology. The disks 108 may be operatively connected to the storage node 106 using IDE, ATA, SATA, PATA, SCSI, USB, PCI, Firewire, FC, or any other bus, link, connection, protocol, network, controller, or combination thereof for I/O transfers.

According to implementations, a storage node 106 may be housed in a one rack space or "1U" unit storing up to four disks 108. For example, the storage node 106A is a 1U computing system that includes four disks 108A-108D. Alternatively, a storage node 106 may be housed in a three rack space or "3U" unit storing up to fifteen disks. For example, the storage node 106G is a 3U computing system that includes fourteen disks 108E-108S. Other types of enclosures may also be utilized for the storage nodes 106 that occupy more or fewer rack units and that store fewer or more disks 108. In this regard, it should be appreciated that the type of storage enclosure and number of disks 108 utilized by a storage node 106 is not generally significant to the implementation of the embodiments described herein. Any type of storage enclosure and virtually any number of disks or other types of mass storage devices may be utilized.

All of the storage nodes 106 in the clusters 104 may be physically housed in the same rack, located in the same building, or distributed over geographically diverse locations, such as various buildings, cities, or countries. Through the use of network ports and other appropriate network cabling and equipment, each storage node 106 within a cluster 104 is communicatively connected to the other nodes within the cluster. Many different types and number of connections may be made between the nodes of each cluster. The storage nodes 106 may be interconnected by any type of network or communication links, such as an Ethernet or Gigabyte Ethernet LAN, a fiber ring, a fiber star, wireless, optical, satellite, a WAN, a MAN, or any other network technology, topology, protocol, or combination thereof. One or more virtual storage clusters 104 may be further communicatively connected together to form the storage system 102.

Each storage node 106 of a cluster 104 may be configured to handle I/O operations independently, but the nodes of the cluster may be exposed to an initiator of an I/O operation as a single, consolidated storage device. It should be appreciated that a storage cluster 104 may include any number of storage nodes 106. A virtualized cluster 104 in which each storage node 106 contains an independent processing unit, and in which each node can field I/Os independently (and route them according to the cluster layout) is referred to as a horizontally virtualized or peer cluster. A cluster 104 in which each storage node 106 provides storage, but the processing and mapping is done completely or primarily in a single node, is referred to as a vertically virtualized cluster.

Data stored in the storage system 102 may be striped across the storage nodes 106 of each cluster 104, or across the storage clusters of the storage system. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance. In addition, one or more disks 108 within a storage node 106, within each cluster 104, or across the clusters of the storage system 102 may contain mirrored data or parity data to provide data redundancy and protection against failure of one or more of the disks 108.

According to embodiments, one or more storage nodes 106 and/or clusters 104 of the storage system 102 may be consolidated and exposed to initiators as a single storage device, such as a storage area network ("SAN") device or a network-attached storage ("NAS") device. A storage processor module 110 is responsible for consolidating and mapping storage across the storage nodes 106 of the storage system 102 as well as coordinating the activities of the nodes. The storage processor module 110 may be implemented in hardware or software on one or more of the storage nodes 106 in the storage system 102, or it may reside in another computing device operatively connected to the storage nodes. In one embodiment, the storage processor module 110 may embody multiple modules executing on and cooperating between the processing units of multiple storage nodes, such as nodes 106D and 106E as shown in FIG. 1.

One or more client computers 112A-112C (referred to generally herein as client computers 112) may further be connected to the storage system 102 via a network 114. The network 114 may be any type of network or communication link, such as an Ethernet or Gigabyte Ethernet LAN, a fiber ring, a fiber star, wireless, optical, satellite, a WAN, a MAN, or any other network technology, topology, protocol, or combination thereof. An appropriate protocol may be utilized to enable the client computers 112 to communicate with the storage system 102 and utilize the various functions provided by the storage processor module 110 over the network 114, as will be described in more detail below in regard to FIG. 2.

Figure 2:
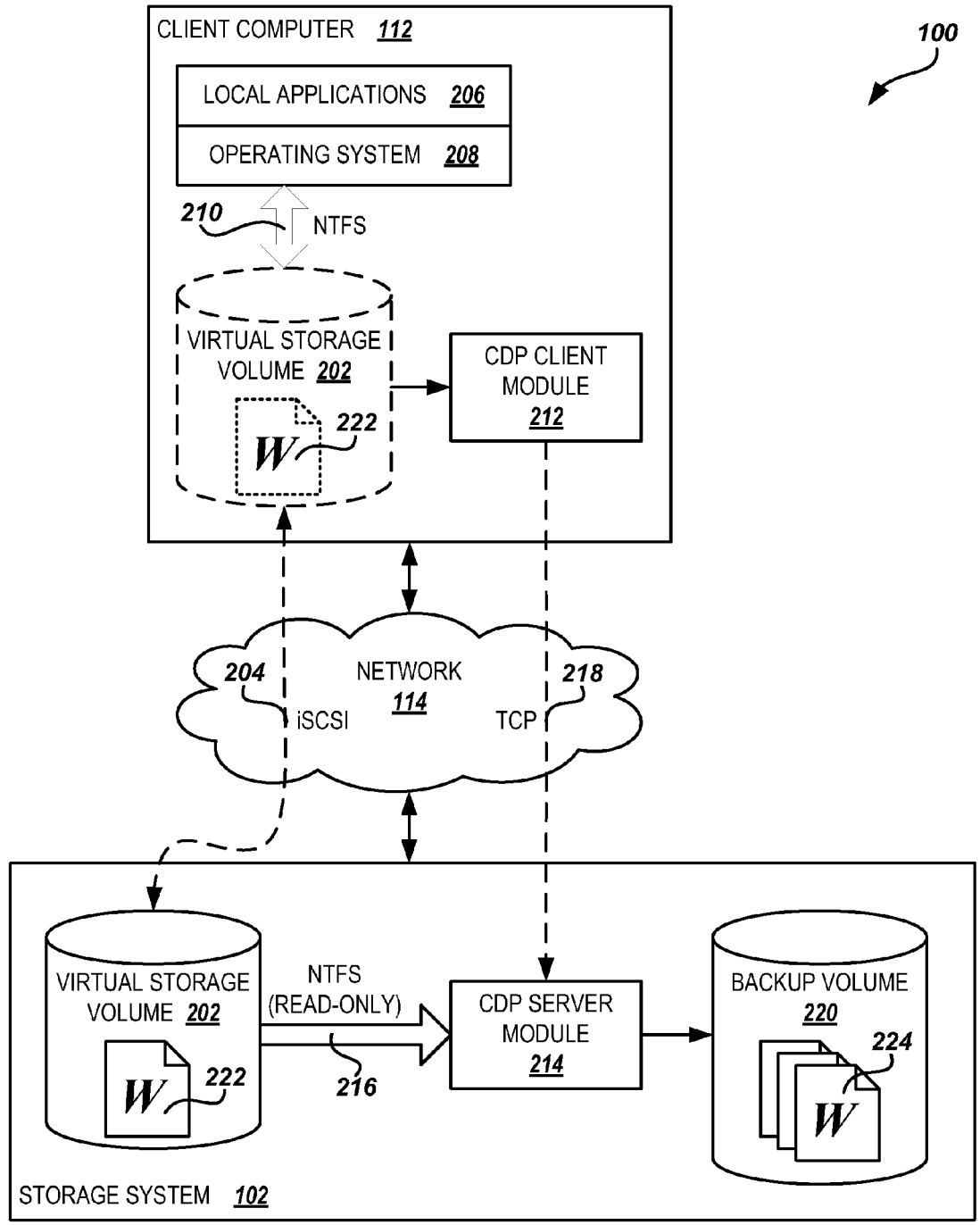
FIG. 2 is a block diagram showing further aspects of an illustrative operating environment, including several software components provided by the embodiments presented herein.

FIG. 2 shows further aspects of the illustrative operating environment 100, including additional details regarding the client computer 112 and the storage system 102, according to embodiments presented herein. In one embodiment, the client computer 112 may be a "thin client," operating without local storage but configured to use a virtual storage volume 202 provided by the storage system 102 as its primary storage device for booting, software execution, and data storage. The client computer 112 accesses the virtual storage volume 202 over the network 114 utilizing the appropriate protocol 204, depending on the type of virtual storage volume provided by the storage system 102.

In one embodiment, the virtual storage volume 202 is a SAN volume, which the client computer 112 accesses using the Internet small computer systems interface ("iSCSI") protocol 204. Local applications 206 and the operating system 208 ("OS") executing on the client computer may read and write files 222 to the SAN volume utilizing a locally implemented file system 210, such as NTFS. The file system 210 then performs input I/O operations against the remote SAN volume at the block level using the iSCSI protocol 204 over the network 114. It will be appreciated that the client computer 112 may utilize other protocols 204 to access the SAN storage volume over the network, including, but not limited to, the fiber channel ("FC") and ATA over Ethernet ("AoE") protocols. In further embodiments, the virtual storage volume 202 may be a NAS volume, which the client computer 112 accesses utilizing a file-level protocol 204, such as the network file system ("NFS") protocol, the server message block ("SMB") protocol, and the like.

According to embodiments, the client computer 112 also includes a CDP client module 212. The CDP client module 212 executes on the client computer 112 and monitors specified files and folders on the virtual storage volume 202 for changes in real-time. The CDP client module 212 may utilize "hooks" provided by the OS 208 or the file system 210 of the client computer to monitor for changes in the specified files and folders. When a file change occurs on the client computer 112, the CDP client module 212 is notified through these hooks by the OS 208 or the file system 210, and initiates the backup of the modified file 222, as will be described in more detail below in regard to FIG. 3. The CDP client module 212 may provide facilities that allow users or administrators of the client computer 112 to specify which files on the virtual storage volume are subject to CDP. The users or administrators may specify folder names, file names, file types, or any other specification of files to monitor.

The CDP client module 212 performs the CDP process in conjunction with a CDP server module 214. According to one embodiment, the CDP server module 214 executes one or more storage nodes 106 of the storage system 102 and has high-speed access to both the virtual storage volume 202 and a backup volume 220. For example, the CDP server module 214 may be a component of or execute in combination with the storage processor module 110 described above in regard to FIG. 1.

In cases where the virtual storage volume 202 provided to the client computer is a block-level device, such as a SAN volume, the CDP server module 214 may access the virtual storage volume by mounting the block-level device through an appropriate file system interface 216, such as an NTFS interface, to have access to the files 222 stored in the file system on the device. For example, in a LINUX based storage system, this may be accomplished using a device-mapper tool, such as kpartx, in conjunction with a file system driver, such as NTFS-3G. In one embodiment, the CDP server module 214 mounts the virtual storage volume 202 in read-only mode in order to avoid potential corruption of the partition tables or other metadata stored in the file system on the device. In cases where the virtual storage volume 202 is a NAS volume, then the CDP server module 214 may access the files 222 from the volume directly.

The CDP client module 212 utilizes a communication protocol 218 to communicate with the CDP server module 214 over the network 114. According to embodiments, the CDP client module 212 utilizes the communication protocol 218 to send simple messages to the CDP server module 214 when a monitored file 222 has been modified on the client computer 112, as will be described in more detail below in regard to FIG. 3. For example, the CDP client module 212 may send a message to the CDP server module 214 containing the file name of modified file 222 and a timestamp indicating when the file was changed. In one embodiment, the communication protocol 218 utilized is TCP. It will be appreciated that other protocols could be utilized for communication between the CDP client module 212 and the CDP server module 214, including, but not limited to, remote procedure calls ("RCP") or JAVA remote method invocation ("RMI").

The backup volume 220 may be another virtual storage device provided by the storage system 102. According to one embodiment, the backup volume 220 is a NAS volume directly accessible by the CDP server module 214, in order to optimize the speed of the CDP process. The NAS volume may also provide easy accessibility to the client computer 112 over the network 114 to perform restore operations. The backup volume 220 may store a number of versions 224 of each monitored file 222 on the virtual storage volume 202. As described above, the versions 224 of the files on the backup volume 220 may be compressed and/or encrypted. In addition, for each monitored file 222 on the virtual storage volume 202, the backup volume 220 may store one or more complete versions 224 of the file, or the backup volume 220 may contain a single base file with deltas stored for each modification made to the file. The number of versions 224 or deltas stored for each file on the backup volume 220 may be configurable by the user or administrator of the client computer 112.

Figure 3:
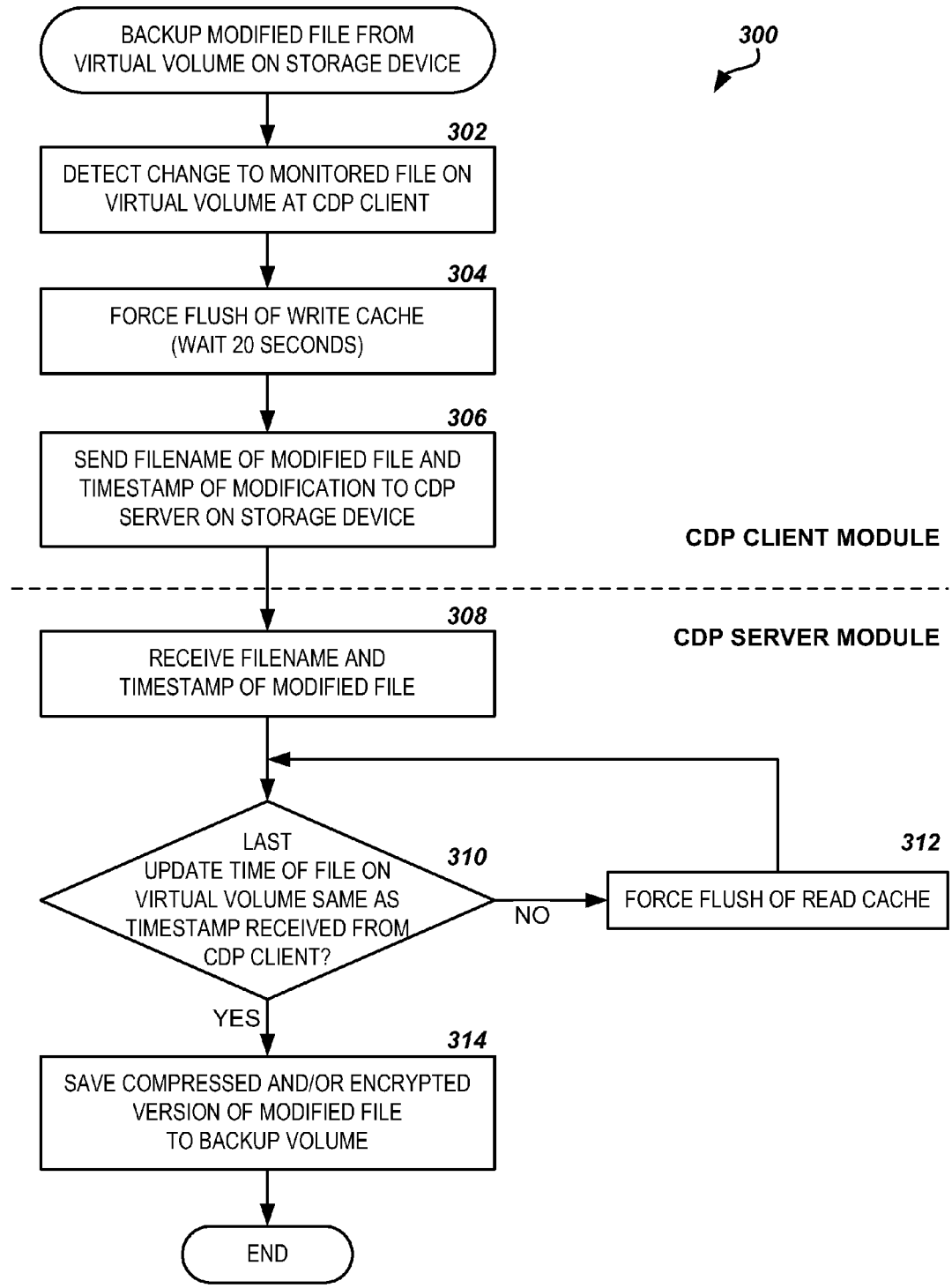
FIG. 3 is a logical flow diagram illustrating one method for providing file-level CDP of files stored on a remote storage system, according to embodiments presented herein.

Turning now to FIG. 3, additional details will be provided regarding the embodiments presented herein for providing file-level CDP of files stored on a remote storage system. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 shows a routine 300 for providing file-level CDP of files stored on a remote storage system 102, according to one embodiment. The routine 300 may be implemented by the CDP client module 212 on the client computer 112 operating in conjunction with the CDP server module 214 in the storage system 102. The routine 300 begins with operation 302, where the CDP client module 212 detects a modification to a monitored file 222 on the virtual storage volume 202 made at the client computer 112. The modification to the file 222 may be the result of a user of the client computer 112 saving a data file within a local application 206, or the OS 208 modifying the file in the course of operation, for example. As discussed above, the CDP client module 212 may detect the modification to the file 222 by receiving a message from a hook provided by the OS 208 or the file system 210 on the client computer 112.

From operation 302, the routine 300 proceeds to operation 304, where the CDP client module 212 forces a flush of the write cache of the file system 210 on the client computer. This is to ensure that the modifications to the file 222 are fully written to the virtual storage volume 202 before sending the corresponding message to the CDP server module 214. The CDP client module 212 may force a flush of the write cache by calling an API provided by the file system 210, or the CDP client module 212 may simply wait a requisite period of time to ensure that the write cache is flushed by the file system 210. For example, in the case of the NTFS file system, the CDP client module 212 may wait 20 seconds to ensure the modification to the file 222 has been flushed from the NTFS write cache to the storage volume 202 before sending the corresponding message to the CDP server module 214.

Next, the routine 300 proceeds from operation 304 to operation 306, where the CDP client module 212 sends a message to the CDP server module 214 on the storage system 102 indicating that a monitored file 222 on the virtual storage volume 202 has changed. The message is sent to the CDP server module 214 over the network 114 utilizing the communication protocol 218 described above. The CDP client module 212 may be configured on the client computer 112 with the destination address of the corresponding CDP server module 214 in the storage system 102, or the CDP client module 212 may discover the corresponding CDP server module 214 based upon the communication properties of the mounted virtual storage volume 202. In one embodiment, the message sent by the CDP client module 212 is a simple TCP message containing the filename of the modified file 222 along with a timestamp indicating the time of modification of the file. The message may further identify the affected virtual storage volume 202 in the storage system 102.

From operation 306, the routine 300 proceeds to operation 308, where the CDP server module 214 receives the message from the CDP client module 212 indicating the change to a monitored file 222 on the virtual storage volume 202. The CDP server module 214 may listen on a specific TCP port for incoming messages from the CDP client module 212. It will be appreciated that a single CDP server module 214 executing in the storage system may service file modification messages from multiple CDP client modules 212 executing on multiple client computers 112 for which the storage system 102 is providing virtual storage volumes. As described above the message may identify the affected virtual storage volume 202, or the CDP server module 214 may determine the affected storage volume based on the identity of the sender of the TCP message.

Upon receiving a message from the CDP client module 212 regarding a modification to the file, the routine 300 proceeds from operation 308 to operation 310, where the CDP server module 214 checks the last update time of the modified file 222 on the affected virtual storage volume 202 to verify that it matches the timestamp received from the CDP client module 212. This is done to ensure that the modifications to the file 222 have been fully written to the volume and the file is in a consistent state. As described above, the CDP server module 214 has access to the virtual storage volume 202 in the storage system 102 through the file system interface 216. The CDP server module 214 may utilize the filename from the message to access the modified file 222 and verify its last update time.

If the last update time of the modified file 222 does not match the timestamp received from the CDP client module 212, then the routine proceeds from operation 310 to operation 312, where the CDP server module 214 forces a flush of the read cache of the file system interface 216 to the virtual storage volume 202 to nullify any effect of the read cache. The routine 300 then returns to operation 310, where the timestamps are compared again to ensure consistency of the file 222. The process of flushing the read cache and verifying the timestamps may continue until the timestamps match, or until a reasonable number of attempts have been made.

After the CDP server module 214 ensures that the file 222 is consistent, in other words, the last update time of the file reported by the file system interface 216 matches the timestamp received from the CDP client module 212, the routine 300 proceeds from operation 310 to operation 314. At operation 314, the CDP server module 214 copies a version 224 of the modified file to the backup volume 220 in the storage system 102. It will be appreciated that this local copy operation from the virtual storage volume 202 to the backup volume 220 may likely be much faster than the CDP client module 212 writing a copy of the file 222 to the backup volume over the network 114.

As described above, the CDP server module 214 may further compress and/or encrypt the version 224 of the modified file copied to the backup volume. Depending on the number of versions 224 of modified files to be retained, the CDP server module 214 may assign a filename to the copy of the modified file on the backup volume 220 that indicates the version, or otherwise differentiates the copy from the other versions of the file stored on the backup volume. If the maximum number of versions 224 for the modified file already exists on the backup volume 220, the oldest version of the file may be deleted before the new version is copied to the volume. From operation 314, the routine 300 then ends.

Figure 4:
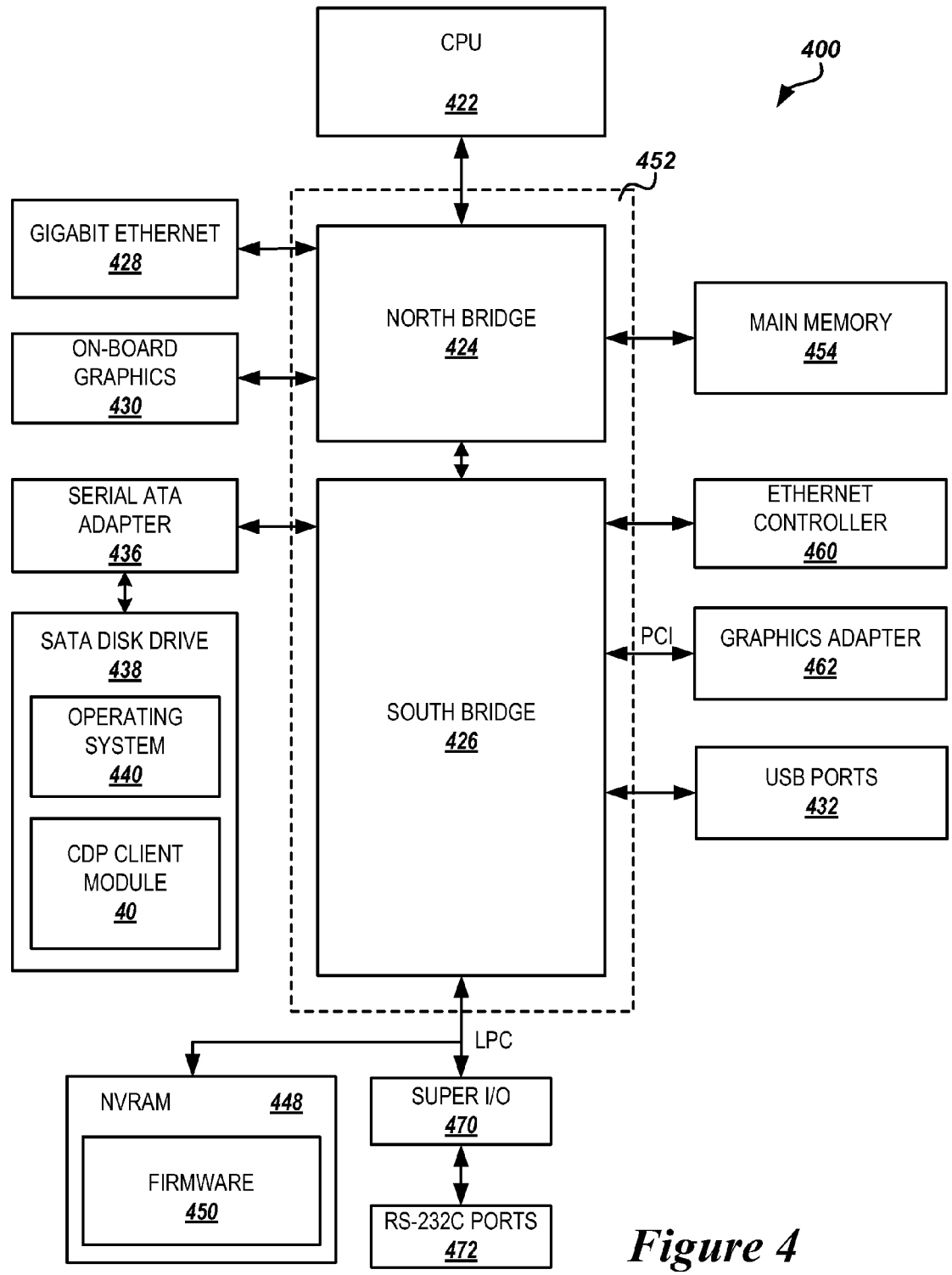
FIG. 4 is a computer architecture diagram illustrating a computer hardware architecture for a computing system capable of implementing aspects of the embodiments presented herein.

FIG. 4 and the following discussion are intended to provide a brief, general description of a suitable computing environment in which the embodiments described herein may be implemented. Those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments, where tasks are performed by remote processing devices that are linked through a communications network. In a distributed computing environment, program modules may be located in both local and remote memory storage devices.

In particular, FIG. 4 shows an illustrative computer system 400 for the storage server computers or storage nodes 106A-106G described above in regard to FIG. 1. Such an illustrative computer system 400 may also describe a client computer 112 or a controller computer of a storage system 102. The computer system 400 includes a baseboard, or "motherboard," which is a printed circuit board to which a multitude of components or devices may be connected by way of a system bus or other electrical communication paths. In one illustrative embodiment, a CPU 422 operates in conjunction with a chipset 452. The CPU 422 is a standard central processor that performs arithmetic and logical operations necessary for the operation of the computer. The computer system 400 may include a multitude of CPUs 422.

The CPU 422 performs the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 452 includes a north bridge 424 and a south bridge 426. The north bridge 424 provides an interface between the CPU 422 and the remainder of the computer system 400. The north bridge 424 also provides an interface to a random access memory (RAM) used as the main memory 454 in the computer system 400 and, possibly, to an on-board graphics adapter 430. The north bridge 424 may also include functionality for providing networking functionality through a gigabit Ethernet adapter 428. The gigabit Ethernet adapter 428 is capable of connecting the computer system 400 to another computer via a network, such as the network 114 described above in regard to FIGS. 1 and 2. Connections which may be made by the network adapter 428 may include LAN or WAN connections. LAN and WAN networking environments are commonplace in offices, enterprise-wide computer networks, intranets, and the Internet. The north bridge 424 is connected to the south bridge 426.

The south bridge 426 is responsible for controlling many of the input/output functions of the computer system 400. In particular, the south bridge 426 may provide one or more universal serial bus (USB) ports 432, a sound adapter 446, an Ethernet controller 460, and one or more general purpose input/output (GPIO) pins. The south bridge 426 may also provide a bus for interfacing peripheral card devices such as a graphics adapter 462. In one embodiment, the bus comprises a peripheral component interconnect (PCI) bus. The south bridge 426 may also provide a system management bus for use in managing the various components of the computer system 400.

The south bridge 426 is also operative to provide one or more interfaces for connecting mass storage devices to the computer system 400. For instance, according to an embodiment, the south bridge 426 includes a serial advanced technology attachment (SATA) adapter 436 for connecting one or more SATA disk drives 438. The mass storage devices connected to the interfaces of the south bridge may provide non-volatile storage for the computer system 400.

The computer system 400 may store information in the mass storage devices by transforming the physical state of the device to reflect the information being stored. The specific transformation of physical state may depend on various factors, in different implementations of this description. Examples of such factors may include, but are not limited to, the technology used to implement the mass storage devices, whether the mass storage devices are characterized as primary or secondary storage, and the like. For example, the computer system 400 may store information to the SATA disk drive 438 by issuing instructions to the SATA adapter 436 to alter the magnetic characteristics of a particular location within the SATA disk drive. These transformations may also include altering the physical features or characteristics of other types of media, including altering the reflective or refractive characteristics of a particular location in an optical storage device, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The computer system 400 may further read information from the mass storage device by detecting the physical states or characteristics of one or more particular locations within the mass storage device.

The SATA disk drive 438 may store an operating system 440 utilized to control the operation of the computer system 400. According to one embodiment, the operating system 440 comprises the LINUX operating system. According to another embodiment, the operating system 440 comprises the WINDOWS® SERVER operating system from MICROSOFT CORPORATION. According to further embodiments, the operating system 440 may comprise the UNIX or SOLARIS operating systems. It should be appreciated that other operating systems may also be utilized. The SATA disk drive 438 may store other system or application programs and data utilized by the computer system 400. In one embodiment, the SATA disk drive 438 may store the CDP client module 212 or CDP server module 214 described above in regard to FIG. 2.

In addition to the mass storage devices described above, the computer system 400 may have access to other computer-readable storage medium to store and retrieve information, such as program modules, data structures, or other data. It should be appreciated by those skilled in the art that computer-readable storage media can be any available media that can be accessed by the computer system 400. By way of example, and not limitation, computer-readable storage media may include volatile and non-volatile, removable and non-removable media implemented in any method or technology for. Computer-readable storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer system 400.

The computer-readable storage medium may be encoded with computer-executable instructions that, when loaded into the computer system 400, may transform the computer system from a general-purpose computing system into special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer system 400 by specifying how the CPU 422 transitions between states, as described above. According to one embodiment, the computer system 400 may have access to computer-readable storage media storing computer-executable instructions that, when executed by the computer system, perform the routine 300, described above in regard to FIG. 3.

A low pin count (LPC) interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory, such as an NVRAM 448 for storing the firmware 450 that includes program code containing the basic routines that help to start up the computer system 400 and to transfer information between elements within the computer system 400. The NVRAM may also store portions of or the entire CDP client module 212 or CDP server module 214, described above in regard to FIG. 2. It will be appreciated that the computer system 400 may not include all of the components shown in FIG. 4, may include other components that are not explicitly shown in FIG. 4, or may utilize an architecture completely different than that shown in FIG. 4.

Based on the foregoing, it should be appreciated that technologies for providing file-level CDP of files stored on a remote storage system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing continuous data protection ("CDP") for a file stored on a virtual storage volume in a data storage system, the method comprising:
   executing a CDP client module on a client computer utilizing the virtual storage volume for storage, the client computer being communicatively connected to the data storage system through a network, the virtual storage volume being accessible to the client computer through the network, the CDP client module configured to:
      detect a modification to the file stored on the virtual storage volume made at the client computer, and
      upon detecting the modification, send a message over the network to the data storage system identifying the file and indicating a time of the modification, wherein the message includes only a filename identifying the file and the time of the modification; and
   executing a CDP server module in the data storage system containing the virtual storage volume, the CDP server module configured to:
      receive the message identifying the file and indicating the time of the modification,
      determine if a time of last update of the file on the virtual storage volume matches the time of the modification, and
      in response to determining that the time of last update of the file on the virtual storage volume matches the time of the modification included in the message sent over the network, locally copy a version of the file containing the modification from the virtual storage volume in the data storage system to a backup volume in the data storage system without writing the version of the file containing the modification over the network.

2. The method of claim 1, wherein the virtual storage volume is a storage area network ("SAN") volume.

3. The method of claim 2, wherein the CDP server module accesses the file on the virtual storage volume by mounting the SAN volume through a file system driver.

4. The method of claim 1, wherein the backup volume is a network attached storage ("NAS") volume.

5. The method of claim 1, wherein the CDP server module is further configured to apply one or more of compression and encryption to the version of the file copied to the backup volume.

6. The method of claim 1, wherein the CDP client module is further configured to, upon detecting the modification to the file, wait a specific period of time before sending the message in order to ensure a write cache for the virtual storage volume has been flushed.

7. The method of claim 1, wherein the CDP server module is further configured to, upon determining that the time of last update of the file on the virtual storage volume does not substantially match the time of the modification, force a flush of a read cache for the virtual storage volume and then re-determine if the time of last update of the file on the virtual storage volume substantially matches the time of the modification.

8. A non-transitory computer-readable storage medium having computer-executable instructions stored thereon that, when executed by a computer utilizing a virtual storage volume in a data storage system for storage, the computer being communicatively connected to the data storage system through a network, the virtual storage volume being accessible to the computer through the network, cause the computer to:
   detect a modification to a file stored on the virtual storage volume made at the computer; and
   upon detecting the modification, send a message over the network to the data storage system identifying the file, wherein the message includes only a filename identifying the file and a time of the modification,
   wherein the data storage system is configured to receive the message identifying the file and, in response to determining that a time of last update of the file on the virtual storage volume matches the time of the modification included in the message sent over the network, locally copy a version of the file containing the modification from the virtual storage volume in the data storage system to a backup volume in the data storage system, without writing the version of the file containing the modification over the network.

9. The non-transitory computer-readable storage medium of claim 8, wherein the data storage system is further configured to only copy the version of the file to the backup volume upon determining that a time of last update of the file on the virtual storage volume matches the time of the modification.

10. The non-transitory computer-readable storage medium of claim 8, wherein the virtual storage volume is a storage area network ("SAN") volume.

11. The non-transitory computer-readable storage medium of claim 8, wherein the backup volume is a network attached storage ("NAS") volume.

12. The non-transitory computer-readable storage medium of claim 8, wherein the data storage system is further configured to apply one or more of compression and encryption to the version of the file copied to the backup volume.

13. The non-transitory computer-readable storage medium of claim 8, having further computer-executable instructions stored thereon that, when executed by the computer, cause the computer to, upon detecting the modification to the file, wait a specific period of time before sending the message in order to ensure a write cache for the virtual storage volume has been flushed.

14. The non-transitory computer-readable storage medium of claim 9, wherein the data storage system is further configured to, upon determining that the time of last update of the file on the virtual storage volume does not substantially match the time of the modification, force a flush of a read cache for the virtual storage volume and then re-determine if the time of last update of the file on the virtual storage volume substantially matches the time of the modification.

15. A system for continuously protecting a file stored on a virtual storage volume, the system comprising:

a data storage server computer and a client computer communicatively connected through a network, the virtual storage volume being accessible to the client computer through the network, each of the data storage server computer and the client computer comprising a processor and memory in communication with the processor;

a client module including computer-executable instructions stored in the memory of the client computer that, when executed by the processor of the client computer utilizing the virtual storage volume for storage, cause the processor of the client computer to detect a modification to the file stored on the virtual storage volume made at the client computer, and upon detecting the modification, send a message over the network to the data storage server computer identifying the file and indicating a time of the modification, wherein the message includes only a filename identifying the file and a time of the modification; and a server module including computer-executable instructions stored in the memory of the data storage server computer that, when executed by the processor of the data storage server computer containing the virtual storage volume, cause the processor of the data storage server computer to receive the message identifying the file and indicating the time of the modification, determine if a time of last update of the file on the virtual storage volume matches the time of the modification, and in response to determining that the time of last update of the file on the virtual storage volume matches the time of the modification included in the message sent over the network, locally copy a version of the file containing the modification from the virtual storage volume in the data storage server computer to a backup volume in the data storage server computer, without writing the version of the file containing the modification over the network.

16. The system of claim 15, wherein the virtual storage volume is a storage area network ("SAN") volume.

17. The system of claim 15, wherein the backup volume is a network attached storage ("NAS") volume.

18. The system of claim 15, wherein the server module includes further computer-executable instructions stored in the memory of the data storage server computer that, when executed by the processor of the data storage server computer, cause the processor of the data storage server computer to apply one or more of compression and encryption to the version of the file copied to the backup volume.

19. The system of claim 15, wherein the client module includes further computer-executable instructions stored in the memory of the client computer that, when executed by the processor of the client computer, cause the processor of the client computer to, upon detecting the modification to the file, wait a specific period of time before sending the message in order to ensure a write cache for the virtual storage volume has been flushed.

20. The system of claim 15, wherein the server module includes further computer-executable instructions stored in the memory of the data storage server computer that, when executed by the processor of the data storage server computer, cause the processor of the data storage server computer to, upon determining that the time of last update of the file on the virtual storage volume does not substantially match the time of the modification, force a flush of a read cache for the virtual storage volume and then re-determine if the time of last update of the file on the virtual storage volume substantially matches the time of the modification.

\* \* \* \* \*